United States Patent
Takeshita (10) Patent No.: US 6,690,430 B1
(45) Date of Patent: *Feb. 10, 2004

(54) CHROMINANCE SIGNAL DEMODULATION CIRCUIT

(75) Inventor: Hiroshi Takeshita, Yokohama (JP)

(73) Assignee: JVC Victor Company & Japan, Ltd., Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/276,165

(22) Filed: Mar. 25, 1999

(30) Foreign Application Priority Data

Mar. 27, 1998 (JP) .......................................... 10-100496

(51) Int. Cl.⁷ .............................. H04N 9/66; H04N 9/78
(52) U.S. Cl. ......................... 348/638; 348/662; 386/41
(58) Field of Search ................................ 348/507, 638, 348/639, 640, 641, 662, 663, 664, 665, 666, 667, 668, 669; 386/10, 16, 19, 41; H04N 9/66, 9/78

(56) References Cited

U.S. PATENT DOCUMENTS

| | | | | |
|---|---|---|---|---|
| 4,710,802 A | * | 12/1987 | Warmuth et al. ............ | 348/639 |
| 5,406,335 A | * | 4/1995 | Nikoh ........................ | 348/639 |
| 5,440,349 A | * | 8/1995 | Ban ............................ | 348/506 |
| 5,512,960 A | * | 4/1996 | Hatano ....................... | 348/638 |
| 5,784,523 A | * | 7/1998 | Quan et al. ................. | 380/201 |
| 5,786,865 A | * | 7/1998 | Ayzenberg et al. ......... | 348/505 |
| 5,870,153 A | * | 2/1999 | Murray et al. .............. | 348/665 |
| 6,034,735 A | * | 3/2000 | Senbongi et al. ........... | 348/505 |

* cited by examiner

Primary Examiner—John Miller
Assistant Examiner—Brian Yenke
(74) Attorney, Agent, or Firm—Anderson Kill & Olick, P.C.; Eugene Lieberstein; Michael N. Meller (57) ABSTRACT

A chrominance signal demodulation circuit capable of precisely processing a chrominance signal demodulation even when a phase of an inputted chrominance signal is abruptly changed due to a tape track skew error. A first and second color difference signals in an R-Y axis and B-Y axis directions are obtained by multiplying a color burst signal of the inputted chrominance signal and color subcarrier signals generated by a color subcarrier generator. A demodulation phase detector 17 generates a phase error signal to compensate a phase difference between the phases of the color burst signal and the color subcarrier signal based on the first and second color difference signals obtained. The color subcarrier generator 12 generates color subcarrier signals compensated responsive to the phase error signal. Thereby, a chrominance information portion following to the color burst signal in the inputted chrominance signal is successively processed with a chrominance signal demodulation with a correct phase. After that, the color burst signal of the first and second color difference signals are replaced with predetermined standard color burst signals.

3 Claims, 6 Drawing Sheets

CHROMINANCE SIGNAL DEMODULATION CIRCUIT

BACKGROUND OF THE INVENTION

1. Field of the Invention

The present invention relates to a chrominance signal demodulation circuit for separating a chrominance signal into a red color difference signal (R-Y) and a blue color difference signal (B-Y).

2. Description of the Related Art

Generally, in a conventional video magnetic recording/reproducing apparatus, a frequency of a chrominance signal of a composite video signal is down-converted, and is recorded on a magnetic tape together with a luminance signal of the composite video signal. In playback, the down-converted chrominance signal is restored to have its original frequency by an up-converter of the apparatus.

Recently, in the video magnetic recording/reproducing apparatus, there is employed an FM modulated chrominance signal reproduction processing system capable of compensating a time-base error or a color noise reduction, wherein the chrominance signal play backed and up-converted is separated into a red color difference signal (R-Y) and a blue color difference signal (B-Y). After the respective color difference signals (R-Y), (B-Y) are appropriately processed, they are again added to each other to restore original chrominance signals.

Figure 7:
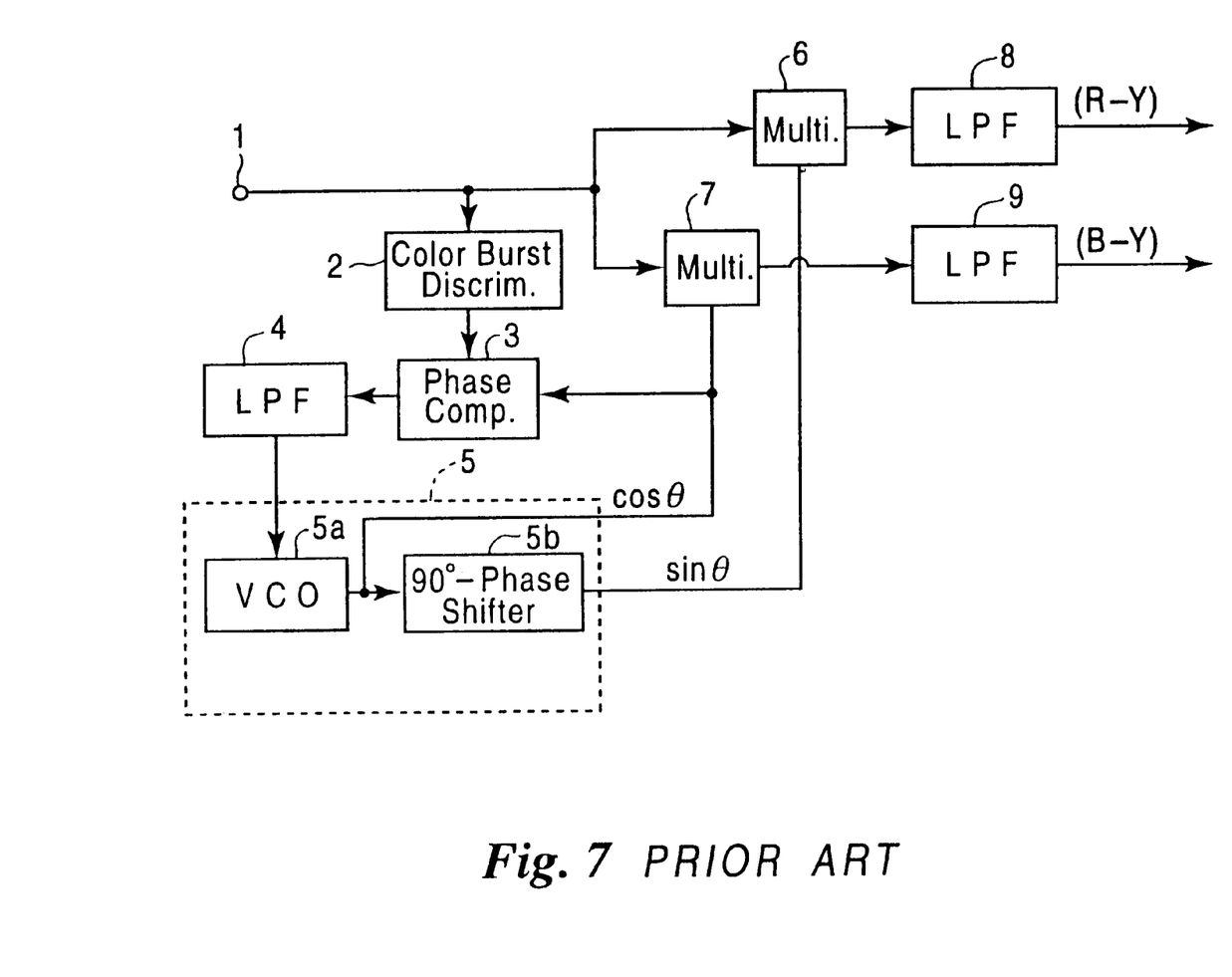

FIG. 7 is a block diagram of a chrominance signal demodulation circuit for separating an up-converted chrominance signal into a red color difference signal (R-Y) and a blue color difference signal (B-Y) in the prior art.

Referring to FIG. 7, a chrominance signal from an input terminal 1 is applied to a color burst discriminator (separator) 2, where only its color burst signal is discriminated or separated from the chrominance signal so that the separated color burst signal is fed to a phase comparator 3.

The phase comparator 3 compares a phase of the color burst signal with a phase of a color subcarrier signal generated from a color subcarrier generator 5, and outputs an error signal responsive to an amount of a phase difference therebetween. This error signal is inputted to a voltage-controlled oscillator (referred to as VCO) 5a of the color subcarrier generator 5 through a low-pass filter (LPF) 4.

The VCO 5a oscillates a signal having a frequency responsive to a level of the error signal outputted from the low-pass filter 4. From the color subcarrier generator 5, two signals are outputted respectively having phases of $\cos \theta$ and $\sin \theta$, the latter is produced from the $\cos \theta$ signal by a 90°-phase shifter 5b. The two signals are respectively inputted to multipliers 7 and 6 as the color subcarrier signals. The multiplier 6 produces a red color difference signal (R-Y) and its harmonic components having a double frequency thereof by multiplying the chrominance signal fed from the input terminal 1 and the color subcarrier signal ($\sin \theta$). The multiplier 7 produces a blue color difference signal (B-Y) and its harmonic components having a double frequency thereof by multiplying the chrominance signal fed from the input terminal 1 and the color subcarrier signal. ($\cos \theta$).

The respective harmonic components are removed by low-pass filters 8 and 9, resulting in the red color difference signal (R-Y) and the blue color difference signal (B-Y), respectively.

As mentioned in the above, in the chrominance signal. demodulation circuit in the prior art, the chrominance signal is inputted to the multipliers 6, 7, and either of the red and blue color difference signals (R-Y), (B-Y) is obtained by multiplying the color subcarrier signal ($\sin \theta$ or $\cos \theta$) which has an identical phase to that of the color burst signal of the chrominance signal. However, when the phase of the color subcarrier signal ($\cos \theta$ or $\sin \theta$) does not completely accord with that of the color burst signal, a precise chrominance signal demodulation processing can not be expected.

In the chrominance signal demodulation circuit mentioned above, the phase comparator 3 and the VCO 5a are typically composed of an analogue circuit, respectively.

The phase comparator 3 and the VCO 5a each composed of such an analogue circuit are apt to be affected by a noise. In addition, they have inherent production dispersion in the characteristics. Thus, in order to alleviate the effect of the noise and the dispersion of the characteristics, the error signal outputted from the phase comparator 3 needs to be inputted to the VCO 5a through the low-pass filter 4 having a gain of less than 1.

However, in the event of employing a filter having a certain time constant in a loop circuit, a response of a feedback loop delays. Thus, it takes some time to make the phase of the color subcarrier signal outputted from the subcarrier generator 5 accord with that of the color burst signal of the inputted chrominance signal.

Accordingly, when an abrupt change of the phase in the inputted chrominance signal develops due to such a tape track skew error developed at a playback in the magnetic recording/reproducing apparatus, it takes some time equivalent to several to several tens horizontal line periods till the phase of the color subcarrier signal accords with that of the color burst signal, resulting in a problem of a phase shift during the period.

And, after these red and blue color difference signals (R-Y), (B-Y) having the phase shift are processed with a time-base error compensation or a color noise reduction, they are subjected to a color reproduction process by addition for displaying a color image on a TV receiver (not shown). As a result, a color shift appears at an upper portion of the image displayed on the TV receiver.

SUMMARY OF THE INVENTION

Accordingly, a general object of the present invention is to provide a chrominance signal demodulation circuit used in, for instance, a video magnetic recording/reproducing apparatus where the above disadvantages have been eliminated.

A specific object of the present invention is to provide a chrominance signal demodulation circuit comprising: multiplying means for producing a first and second color difference signals by multiplying a color subcarrier signal and a color burst portion of a chrominance signal inputted to the chrominance signal demodulation circuit; phase error producing means for outputting a phase error signal from the first and second color difference signals by calculating a phase error between a phase of the color burst portion of the inputted chrominance signal and phases the color subcarrier signals; phase compensation means for compensating the phase of the color subcarrier signal so as to accord with the phase of the color burst portion in responsive to the phase error signal generated from the phase error producing means, and means for replacing the respective color burst portions of the first and second color difference signals with a predetermined standard color burst signal.

Another and more specific object of the present invention is to provide a method for demodulating a chrominance signal inputted to a chrominance signal demodulation circuit, the method comprising the steps of: producing first and second color difference signals from the chrominance signal by multiplying a color burst portion of the chrominance signal and color subcarrier signals locally generated from a color subcarrier generation means, the color subcarrier signals having a phase difference of 90° degrees each other and a frequency of the chrominance signal inputted to the chrominance signal demodulation circuit; producing a phase error signal representing a phase error between a phase of the color burst portion of the chrominance signal and a phase of one of the first and second color difference signals, by detecting a level difference between respective color burst portions of the first and second color difference signals and calculating the phase error from the level difference using a conversion table; compensating the phase error developed in the color subcarrier generation means so as to accord a generated phase of one of 2 color subcarrier signals with the phase of the color burst portion of the chrominance signal inputted to the chrominance signal demodulation circuit by feeding the phase error signal to the color subcarrier generation means, and repeating a process of compensating the phase error for every horizontal period of the chrominance signal; and replacing color burst portions of the first and second color difference signals with a predetermined standard color burst signal after undergoing the process of phase error compensation.

DETAILED DESCRIPTION OF THE PREFERRED EMBODIMENTS

The chrominance signal demodulation circuit of the present invention has a feature of processing a precise chrominance signal demodulation in such as NTSC system even when an inputted chrominance signal has an abrupt phase change developed by such as a tape track skew error. As well known, the skew error is developed by a difference of back tension caused on the magnetic tape between its recording and playback. At that time, a phase shift of a color burst signal of the inputted chrominance signal is developed before and after the skew error generation, resulting in a color shift in a displayed image. However, the chrominance signal demodulation circuit of the present invention effectively prevents the phase shift from developing.

Figure 1:
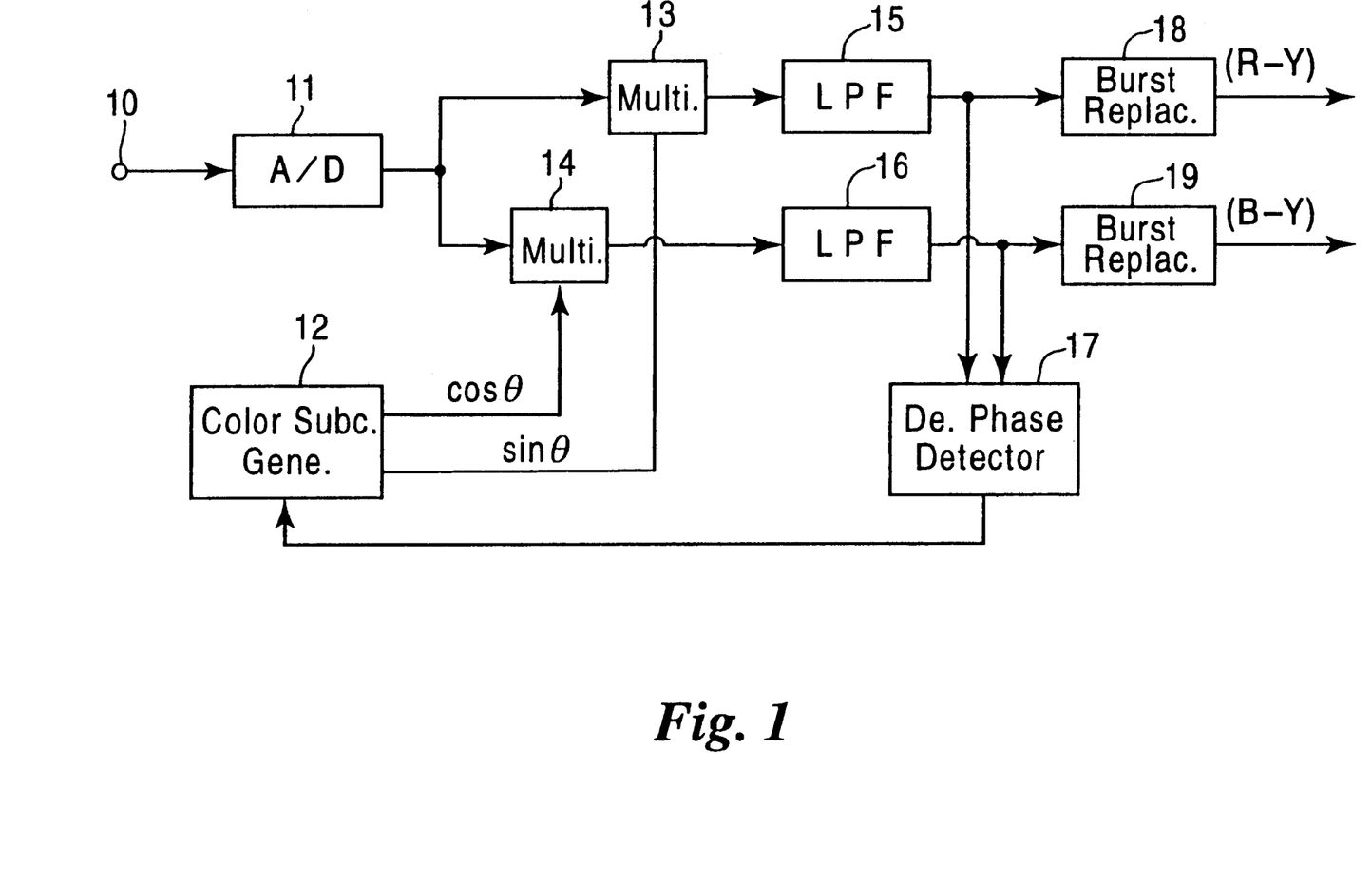
FIG. 1 is a block diagram of a chrominance signal demodulation circuit of an embodiment in the present invention.

FIG. 1 is a block diagram of a chrominance signal demodulation circuit of an embodiment in the present invention.

Here, a description is given of a case where the chrominance signal demodulation circuit is employed in a video magnetic recording/reproducing apparatus.

In FIG. 1, a reference character 10 designates an input terminal for inputting a chrominance signal up-converted in a chrominance signal reproduction processing system (not shown), 11 an A/D converter for converting an analogous chrominance signal from the input terminal 10 into a digital format signal, 12 a color subcarrier generator for generating color subcarrier signals (sin θ and cos θ). The color subcarrier signal has a frequency equal to a nominal frequency of the inputted chrominance signal and phases of the respective color subcarrier signals are controlled responsive to a demodulation coordinate axis error signal generated from a demodulation phase detector 17 as mentioned hereinafter.

Further, a reference character 13 designates a first multiplier for producing a red color difference signal (R-Y) and its harmonic components by multiplying a digitized chrominance signal from the A/D converter 11 and the color subcarrier signal (sin θ) generated from the color subcarrier generator 12, and 14 a second multiplier for producing a blue color difference signal (B-Y) and its harmonic components by multiplying the digitized chrominance signal from the A/D converter 11 and the color subcarrier signal (cos θ) generated from the color subcarrier generator 12.

A reference character 15 designates a first low-pass filter (LPF) for extracting only the red color difference signal (R-Y) from a mixture of the red color difference signal (R-Y) and its harmonic components having the double frequency and 16 a second low-pass filter (LPF) for extracting only the blue color difference signal (B-Y) from a mixture of the blue color difference signal (B-Y) and its harmonic components having a double frequency.

Further, a reference character 17 designates a demodulation phase detector for detecting a phase difference between an initial phase of a color subcarrier signal such as the cos θ generated from the color subcarrier generator 12 and a phase of the color burst signal of the chrominance signal inputted from the input terminal 10 based on signal levels of the red and blue color difference signals (R-Y), (B-Y) inputted thereto from the first and second low-pass filters (LPFs) 15, 16, and generating a demodulation coordinate axis error signal for making initial phases of the respective color subcarrier signal (sin θ and cos θ) coincide with the phase of the color burst portion of the chrominance signal.

And, a reference character 18 designates a first color burst replacing section for replacing the color burst signal of the red color difference signal (R-Y) and 19 a second color burst replacing section for replacing the color burst signal of the blue color difference signal (B-Y).

Figure 2:
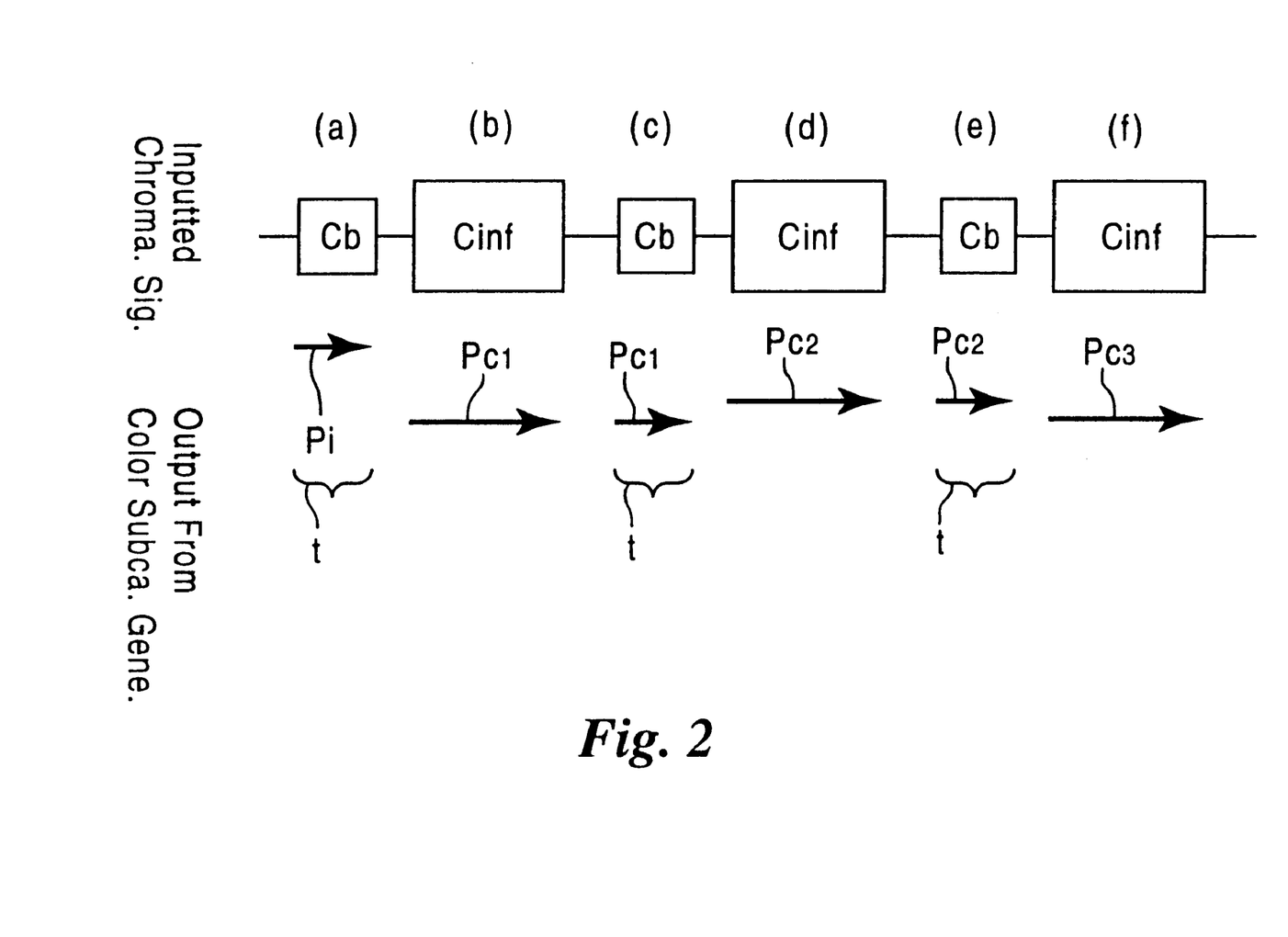
FIG. 2 is a schematic view for explaining a concept of a chrominance signal demodulation processed in the chrominance signal demodulation circuit of the present invention.
Figure 3:
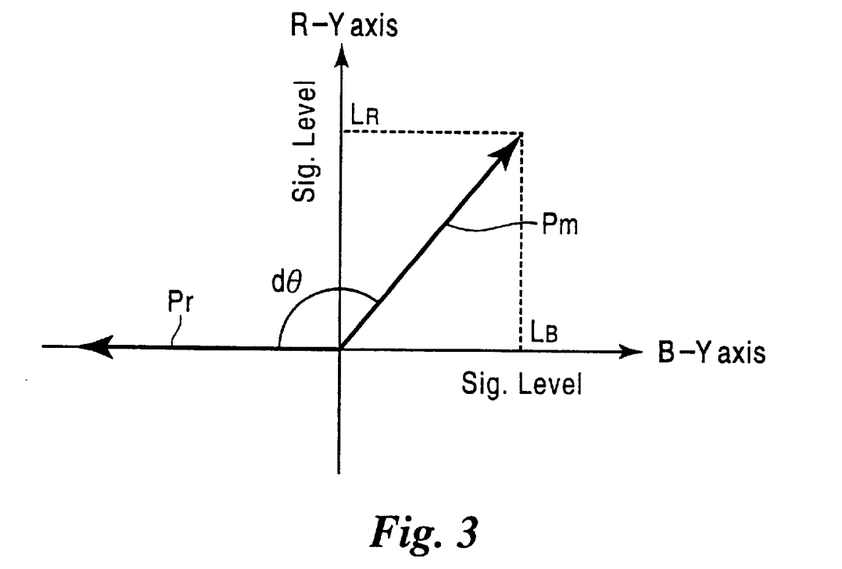
FIG. 3 is a graph for explaining an arithmetic method for obtaining a demodulation coordinate axis error signal in a demodulation phase detector.

FIG. 2 is a schematic view for explaining a concept of a demodulation processing performed in the chrominance signal demodulation circuit of the present invention; and FIG. 3 is a graph for explaining an arithmetic method for obtaining a demodulation coordinate axis error signal in a demodulation phase detector.

Referring to FIGS. 2 and 3, a description is given of a concept of a color demodulation processing in the present invention. The alphabets in brackets in the following refer to the alphabetic steps shown in FIG. 2.

(a) The chrominance signal fed to the input terminal 10 is processed with an A/D-conversion by the A/D converter 11. In the demodulation phase detector 17, the color burst signal Cb of the chrominance signal is demodulated with an initial phase Pi of a color subcarrier signal generated from the color subcarrier generator 12. The demodulation phase detector 17 generates a demodulation coordinate axis error signal based on signal levels of the demodulated color burst signal in an R-Y axis direction and B-Y axis direction. The demodulation coordinate axis error signal represents a degree of deviation of the initial phase Pi of the color subcarrier signal (sin θ or cos θ) from a phase of the color burst signal of the chrominance signal as as explained later with FIG. 3. In FIG. 2, a reference character t designates a required time span for generating a demodulation axis error signal by the demodulation phase detector 17.

(b) The color subcarrier generator 12 generates phase-compensated color subcarrier signal (cos θ) based on the demodulation coordinate axis error signal to demodulate the chrominance signal information portion Cinf residing after the color burst signal Cb with the compensated color sub-carrier signal (sin θ and cos θ) having a compensated phase Pc1.

(c) Further, a color burst signal Cb of the successive horizontal scanning period is demodulated with the compensated color subcarrier signal having the compensated phase Pc1.

(d) The color subcarrier generator 12 generates an additionally phase-compensated color subcarrier signal based on the demodulation coordinate axis error signal to demodulate the chrominance signal information portion Cinf residing after by the color burst signal Cb with the phase-compensated color subcarrier signal (sin θ and cos θ) having a compensated phase Pc2.

This operation is repeated successively as shown in (e) and (f) in FIG. 2.

As seen from FIG. 2, the color burst signal Cb and the subsequent chrominance signal information portion Cinf in the chrominance signal in respective horizontal line are respectively demodulated by a different subcarrier signal having a different phase like as ((Pi, Pc1) and (Pc1, Pc2). However, the color burst signal of each of the color difference signals (R-Y) and (B-Y) is replaced with a standard color burst signal in color burst replacing circuits 18, 19 shown in FIG. 1. Thus, it is possible to hold a constant phase of a color burst signal at every horizontal line, resulting in a prevention of a color shift of an image displayed on a TV (not shown).

As shown in FIG. 3, when the color burst signal of the chrominance signal is demodulated with the initial phase Pi of the color subcarrier signal, there are revealed signal levels $L_R$ and $L_B$ of the color burst signal Cb in the R-Y and B-Y axis directions.

And, from the signal level $L_R$ in the R-Y axis direction and the signal level $L_B$ in the B-Y axis direction, a phase difference dθ between a vector Pm of the color burst signal Cb demodulated by the initial phase Pi of the color subcarrier signal and a vector Pr (normal phase) of the color burst signal is revealed. Thereby, the demodulation coordinate axis error signal is obtained and is outputted to the color subcarrier generator 12.

Figure 4:
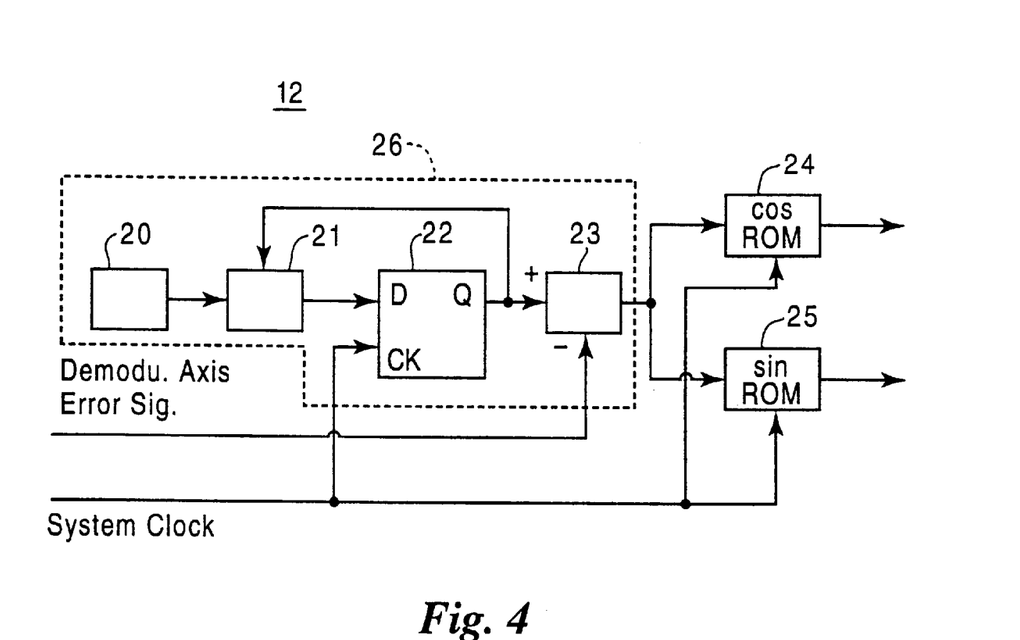
FIG. 4 is a block diagram of a structure of a color subcarrier generator 12.

FIG. 4 is a block diagram of a structure of a color subcarrier generator 12.

Next, a description is given of a structure of the color subcarrier generator 12 referring to FIG. 4.

The color subcarrier generator 12 is generally composed of an address generating section 26 and a cosROM 24 and a sinROM 25. The address generating section 26 is composed of a constant generator 20, an adder 21, a D type flip-flop 22 and a subtracter 23. In the cosROM 24 and sinROM 25, there are written segments of cosine wave and sine wave of one cycle, and the segments have 1024 addresses, respectively.

Thereby, it is possible to generate a color subcarrier signal responsive to designated numbers of the addresses by continuously reading out the information stored in the cosROM 24 and the sinROM 25 according to addresses with an increment of a a constant value at every clock.

As mentioned above, there are provided the addresses of 1024 to each of the cosROM 24 and sinROM 25, respectively. Thus, in order to generate the color subcarrier signal having 1/3.2 time as small frequency as that of the system clock, the address generating section 26 generates the addresses at an increment of 1024/3.2=320 at every one system clock.

As the number of the addresses corresponding to one cycle in the respective cosROM 24 and sinROM 25 is 1024, 360° shown in FIG. 3 can be replaced with 1024. Thus, when the signal levels on the R-Y axis and the B-Y axis are represented by $L_R$ and $L_B$ in the event of demodulating the color burst signal of the chrominance signal, the demodulation phase detector 17 generates a demodulation coordinate axis error signal Er (dθ) representing a phase error angle dθ subtended by vectors Pm and Pr. The phase error angle dθ is represented by an equation (1).

$$d\theta = 180° - \tan^{-1}(L_R/L_B)/360 \quad (1)$$

Thus, a demodulation coordinate axis error signal Er(dθ) corresponding to the phase error angle dθ is represented by an equation (2).

$$Er(d\theta) = (1024/2) - 1024 \times \tan^{-1}(L_R/L_B)/360° \quad (2)$$

The above equations (1), (2) represent an example of a calculation in a case where the values of the $L_R$ and $L_B$ have plus values, wherein the values of $\tan^{-1}(L_R/L_B)$ are limited to 0°–90°.

When either of the $L_R$ or $L_B$ has a minus value, or both of them have minus values, the values of $\tan^{-1}(L_R/L_B)$ are calculated by considering minus and plus signs of the values of the $L_R$ and $L_B$, wherein the values of $\tan^{-1}(L_R/L_B)$ are limited to 90° to 360°. From above calculation results, the demodulation phase detector 17 generates the demodulation coordinate axis error signal Er(dθ).

As an embodiment of the present invention, the demodulation phase detector 17 contains level-detectors for detecting the values $L_B$ and $L_R$, and a ROM in which a conversion table obtained from the calculation results mentioned above is stored. From the detected values $L_B$, $L_R$, a value of the demodulation coordinate axis error Er(dθ) is read out from the conversion table and fed to the color subcarrier generator 12.

In the address generating section 26, the addresses outputted from the D type flip-flop 22 and the calculated demodulation coordinate axis error signal dθ are supplied to a subtracter 23. The output signal from the subtracter 23 is inputted to the cosROM 24 and the sinROM 25 to adjust the addresses to read out cosine and sine waveform data from the cosROM 24 and the sinROM 25.

Thereby, color subcarrier signals are outputted from the cosROM 24 and the sinROM 25 by being compensated corresponding to the adjusted addresses. Thus, the chrominance information portion Cinf of the chrominance signal is demodulated by the color subcarrier signal (cos θ, sin θ) compensated with respect to the phase error.

Figure 5:
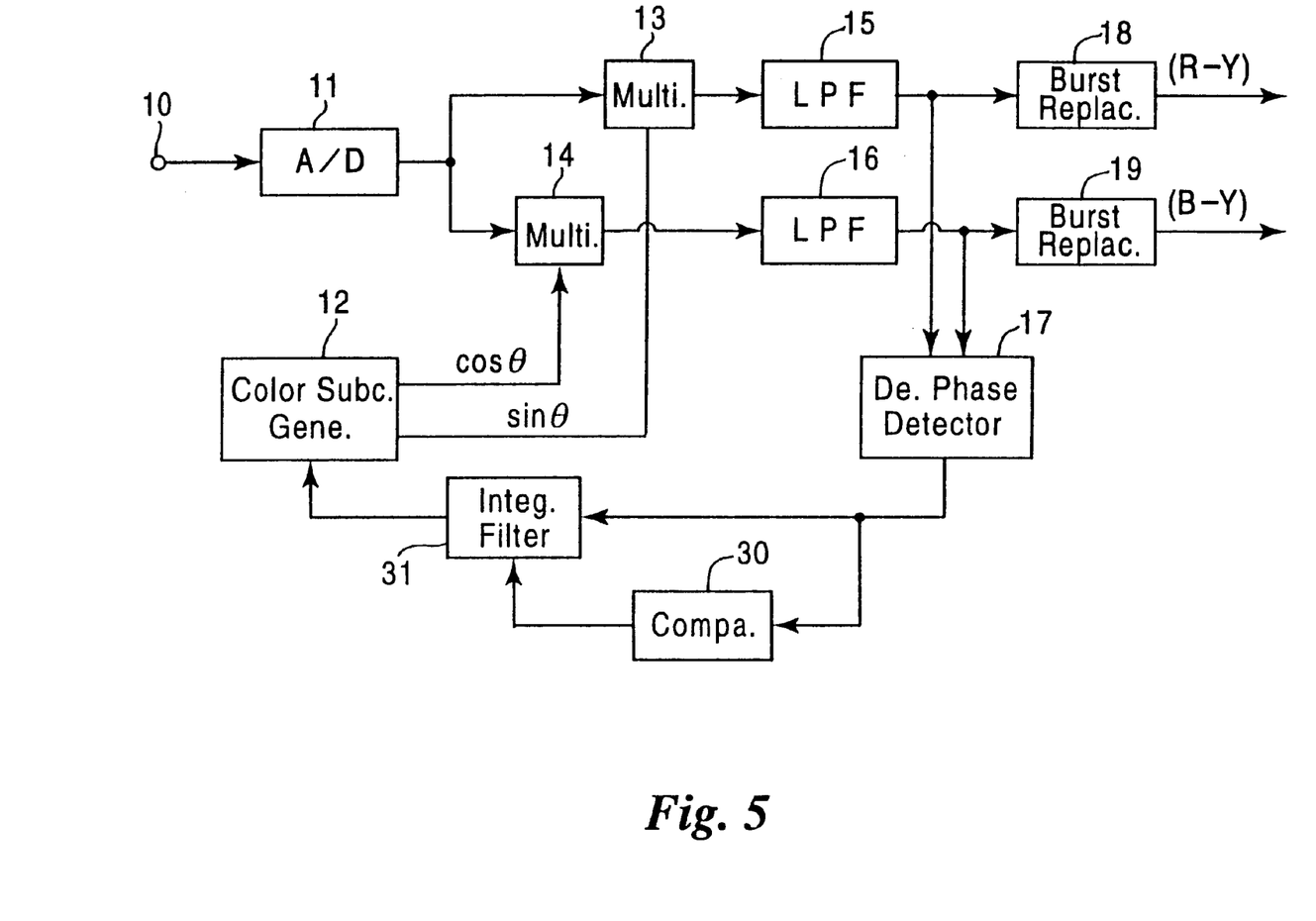
FIG. 5 is a block diagram of another embodiment of the chrominance signal demodulation circuit in the present invention.

FIG. 5 is a block diagram of another embodiment of the chrominance signal demodulation circuit in the present invention.

When an S/N of reproduced chrominance signal is poor, the phase of the color burst signal of the chrominance signal is apt to change minutely.

The chrominance signal demodulation circuit of another embodiment in the present invention has a feature of preventing an undesired fluctuation of the color subcarrier signal due to the minute change of the color burst signal.

In the chrominance signal demodulation circuit shown in FIG. 5, a comparator 30 and an integrate filter 31 are added to the chrominance signal demodulation circuit shown in FIG. 1, and other components are the same as those shown in FIG. 1. Thus, like parts are shown with like reference characters, and the detailed explanation thereof is omitted.

Here, the comparator 30 generates a signal responsive to whether a value of the demodulation coordinate axis error signal outputted from the demodulation phase detector 17 exceeds a predetermined threshold value or not.

The integrate filter 31 outputs the demodulation coordinate axis error signal as it is when the value of the demodulation axis error signal is discriminated to be larger than the predetermined threshold value by the comparator 30, and outputs only low frequency components of the demodulation coordinated axis error signal when the value of the demodulation coordinate axis error signal is discriminated to be smaller than the predetermined threshold value by the comparator 30.

More specifically, when the value of the demodulation coordinate axis error signal outputted from the demodulation phase detector 17 is discriminated to be larger than the threshold value by the comparator 30, namely, when the phase of the color burst signal of the chrominance signal changes largely due to a skew error, the integrate filter 31 is made ineffective so that the demodulation coordinate axis error signal is outputted as it is. When the value of the demodulation coordinate axis error signal is discriminated to be not so large, namely, when the phase of the color burst signal of the chrominance signal is not changed so much, the integrate filter 31 is switched to operate so that only the low frequency components of the demodulation coordinate axis error signal is outputted.

As mentioned above, it is possible to prevent the color subcarrier generator 12 from generating an undesirably phase-changed color subcarrier signal even when the phase of the color burst signal of the chrominance signal is minutely changed due to a noise, and is possible to compensate the phase change of the color subcarrier signal instantly when the phase of the color burst signal of the chrominance signal is largely changed due to the skew error, by switching the function of the integrate filter 31 on or off.

Figure 6:
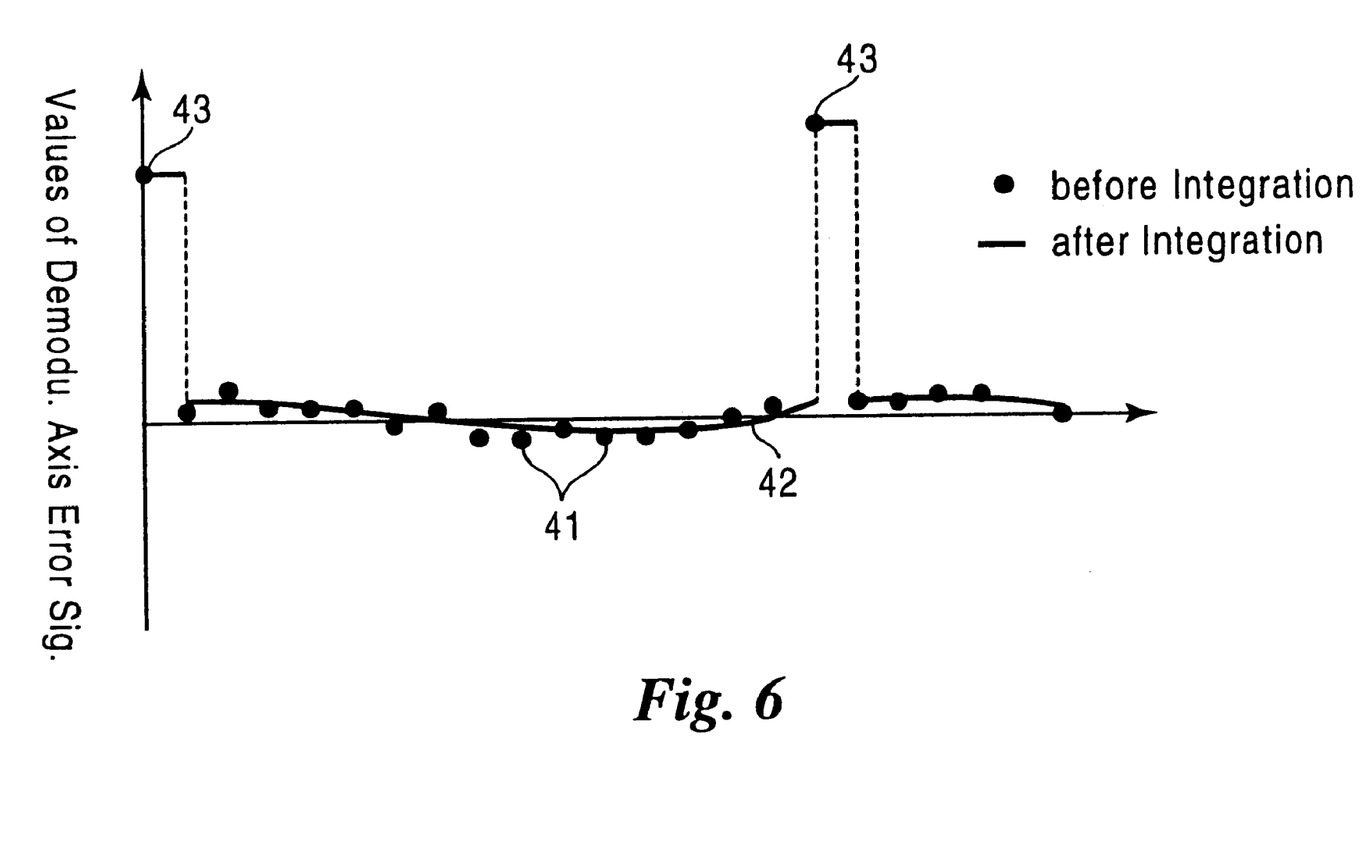
FIG. 6 is a graph for explaining a change of an output signal from the integrate filter responsive to a value of the demodulation coordinate axis error signal outputted from a demodulation phase detector and FIG. 7 is a block diagram of a chrominance signal demodulation circuit for separating an up-converted chrominance signal into a red color difference signal (R-Y) and a blue color difference signal (B-Y) in the prior art.

FIG. 6 is a graph for explaining a level change of an output signal from the integrate filter 31 responsive to a value of the demodulation coordinate axis error signal outputted from the demodulation phase detector 17.

Referring to FIG. 6, a reference character 41 designates values of the demodulation coordinate axis error signal before processed with integration by the integrate filter 31, and 42 a value of the demodulation coordinate axis error signal after processed with integration by the integrate filter 31, and 43 values of the demodulation coordinate axis error signal without being processed with integration when the value of the demodulation coordinate axis error signal is larger than a predetermined threshold value.

As shown in FIG. 6, when the phase of the color burst signal is largely changed due to a skew error and the value of the demodulation coordinate axis error signal becomes larger correspondingly therewith, a demodulation coordinate axis error signal 43 is directly inputted without an integration to the color subcarrier generator 12 passing through the integrate filter 31, which is deactivated as explained before.

Further, during the deactivated period thereof, the integrate filter 31 holds an output value of the demodulation phase detector 17, which is fed to the integrate filter 31 right before its deactivation, so that the integrate filter 31 resumes the integration process from this small held value as shown in FIG. 6.

As mentioned of the chrominance signal demodulation circuit of the present invention, it is possible to cause the phase of the color burst signal of the chrominance signal to coincide with the phase of the color subcarrier signal instantly even when an abrupt phase change develops in the chrominance signal due to the skew error, resulting in a precise chrominance signal demodulation. This contributes to eliminate a color shift developed at an upper portion of an image when the image is displayed on the TV screen after a color reproducing process by addition (not shown).

Further, in the embodiments mentioned above, an explanation is given of a case where the chrominance signal demodulation circuit of the present invention is applied to a magnetic recording/reproducing apparatus, however, it is possible to obtain the same effect as that in a case where the chrominance signal demodulation circuit of the present invention is applied to TV receivers and the abovementioned signal processing is performed in them.

In summery, according to the chrominance signal demodulation circuit of the present invention, even when there is developed an abrupt phase change in an inputted chrominance signal due to a skew error, it is possible to prevent the phase shift of the color burst signal therein caused as a transient from normal to a skew error generation, resulting in a precise chrominance signal demodulation processing.

further, even when the phase of the color burst signal of the inputted chrominance signal is minutely changed due to a degradation of an s/n of the chrominance signal, it is possible to perform a more precise chrominance signal demodulation processing by limiting or preventing the undesired minute phase change of the color subcarrier signal associated with the minute phase change of the color burst signal.

What is claimed is:

1. A chrominance signal demodulation circuit comprising:

subcarrier producing means for producing a first and a second subcarrier signal;

multiplying means for multiplying the first subcarrier signal produced by the subcarrier producing means with a chrominance signal inputted to the chrominance signal demodulation circuit for producing first and second color difference signals;

phase error outputting means for calculating a phase error between the first subcarrier signal and a color burst portion of a predetermined line of the inputted chrominance signal in accordance with the first and second color difference signals produced by the multiplying means and for outputting the calculated phase error as a phase error signal;

comparing means for comparing the phase error signal outputted from the phase error outputting means with a predetermined value;

integrating means for outputting the phase error signal from the phase error outputting means without integrating the phase error signal when the phase error signal is larger than the predetermined value, and for outputting the phase error signal after integrating the phase error signal when the phase error signal is less than the predetermined value as a result of comparison by the comparing means;

subcarrier phase controlling means for controlling the subcarrier producing means so as to vary a phase of subcarrier produced by the subcarrier producing means in response to a phase error signal outputted from the integrating means; and the chrominance signal demodulation circuit is further characterized in that the subcarrier producing means outputs a second subcarrier signal of which a phase is coincide with the color burst portion of the predetermined line to the multiplying means in order to demodulate a color signal portion of the predetermined line when the phase error signal is larger than the predetermined value as a result of comparison by the comparing means, and that the subcarrier producing means outputs a third subcarrier signal having an intermediate phase between a phase of the first subcarrier signal and a phase of the color burst portion of the predetermined line to the multiplying means in order to demodulate a color signal portion of the predetermined line when the phase error signal is less than the predetermined value as a result of comparison by the comparing means.

2. A chrominance signal demodulation circuit comprising:

subcarrier producing means for producing a first, a second, and a third subcarrier signals;

multiplying means for multiplying the first subcarrier signal produced by the subcarrier producing means with a chrominance signal inputted to the chrominance signal demodulation circuit for producing first and second color difference signals;

phase error outputting means for calculating a phase error between the first subcarrier signal and a color burst portion of a predetermined line of the inputted chrominance signal in accordance with the first and second color difference signals produced by the multiplying means and for outputting the calculated phase error as a phase error signal;

comparing means for comparing the phase error signal outputted from the phase error outputting means with a predetermined value;

integrating means for outputting the phase error signal from the phase error outputting means without integrating the phase error signal when the phase error signal is larger than the predetermined value, and for outputting the phase error signal after integrating the phase error signal when the phase error signal is less than the predetermined value as a result of comparison by the comparing means;

subcarrier phase controlling means for controlling the subcarrier producing means so as to vary a phase of subcarrier produced by the subcarrier producing means in response to a phase error signal outputted from the integrating means; and the chrominance signal demodulation circuit is further characterized in that the subcarrier producing means outputs the second subcarrier signal of which a phase is coincide with the color burst portion of the predetermined line to the multiplying means in order to demodulate a color signal portion of the predetermined line when the phase error signal is larger than the predetermined value as a result of comparison by the comparing means, and that the subcarrier producing means outputs the third subcarrier signal having an intermediate phase between a phase of the first subcarrier signal and a phase of the color burst portion of the predetermined line to the multiplying means in order to demodulate a color signal portion of the predetermined line when the phase error signal is less than the predetermined value as a result of comparison by the comparing means.

3. A chrominance signal demodulation circuit as claimed in claim 2 comprising color burst replacing means for replacing respective color burst portions of the first and second color difference signals with a predetermined standard color burst sitgnal.

* * * * *